W. S. HALSEY.
ROLLER BEARING.
APPLICATION FILED APR. 23, 1920.
1,418,304.
Patented June 6, 1922.
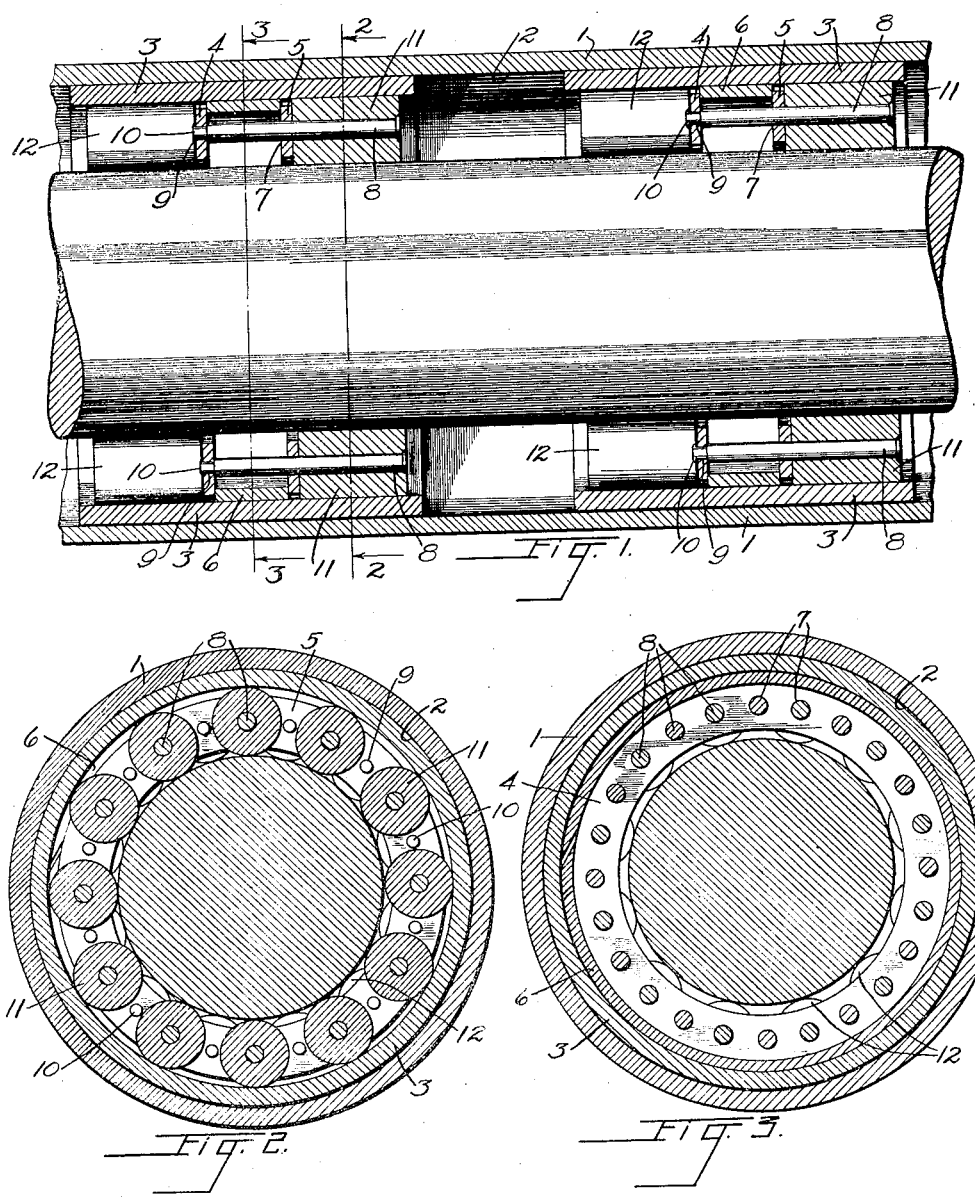

UNITED STATES PATENT OFFICE.

WILLIAM S. HALSEY, OF DOVER, NEW JERSEY.

ROLLER BEARING.

1,418,304.  Specification of Letters Patent.  Patented June 6, 1922.

Application filed April 23, 1920. Serial No. 376,015.

*To all whom it may concern:*

Be it known that I, WILLIAM S. HALSEY, a citizen of the United States, and a resident of Dover, in the county of Morris and State of New Jersey, have invented a new and useful Improvement in Roller Bearings, of which the following is a full, clear, and exact description.

My invention relates to improvements in roller bearings, and it consists in the combinations, constructions and arrangements herein described and claimed.

An object of my invention is to provide an inexpensive anti-friction bearing of the roller type, having means within itself for holding it at any fixed point on the shaft and within its housing.

A further object of my invention is to provide a bearing of the type described in which the removing and the replacement of the bearing may be readily accomplished with the use of ordinary tools.

A further object of my invention is to provide a self holding bearing having relatively few parts but which will positively prevent the rollers from traveling axially on the shaft.

Other objects and advantages will appear in the following specification, and the novel features of the invention will be particularly pointed out in the appended claims.

My invention is illustrated in the accompanying drawings, forming part of this application in which Figure 1 is a section through a pair of roller bearings constructed according to my invention, Figure 2 is a section along the line 2—2 of Figure 1, and Figure 3 is a section along the line 3—3 of Figure 1.

In carrying out my invention I make use of any suitable housing 1 having a cylindrical bore 2, arranged to receive the bearing sleeve or outer race 3 of the roller bearing.

The latter comprises a pair of metal rings 4 and 5 which are spaced apart by means of a spring ring 6 adapted to bear against the sleeve 3. Each of the rings 4 and 5 is provided with a series of openings 7 arranged to receive the stub shafts 8 whose ends are reduced as shown at 9 and are arranged to enter openings 10 in the opposite ring, to which they are secured by upsetting the ends.

As will be seen from Figure 1 the stub shafts 8 are arranged on each side of the rings 4 and 5, those on one side passing through the ring 4 and having their reduced ends secured in the ring 5, while those on the opposite side pass through the ring 5 and have their reduced ends secured in the ring 4. This construction provides supports for rollers 11 and 12 the rollers 11 being offset or staggered with respect to the rollers 12. The stub shafts 8 are arranged to pass through the rollers, the ends of the stub shafts being upset to prevent the roller from coming off of the shaft.

From the foregoing description of the various parts of the device the operation thereof may be readily understood.

The sleeves 3 are pressed into the housing 1. The roller bearing unit is inserted in the sleeve and is pushed into the position desired by contracting the spring ring 6. The unit is located so that the rollers are spaced symmetrically with respect to the sleeve or outer race 3. The spring ring 6 engages the sleeve so as to hold the unit in position and to prevent axial movement of the bearing along the shaft 13. The latter passes through the central opening in the rings 4 and 5, the rollers bearing on the shaft and on the sleeve 3 as shown.

This construction permits the ready insertion of the roller bearing unit but obviates the necessity of providing separate means such as collars which are made fast to the shaft or the housing to confine the rollers and to prevent them from longitudinal movement along the shaft. It also provides a relatively simple construction having few parts.

I claim:

1. The combination with a bearing sleeve, of a roller bearing unit comprising a pair of parallel rings a spring ring disposed between said parallel rings and arranged to frictionally engage said bearing sleeve, stub shafts carried by said rings and rollers mounted for rotation on said stub shafts.

2. The combination with a bearing sleeve, of a roller bearing unit comprising a pair of parallel rings spaced apart, stub shafts secured to the rings and projecting laterally therefrom, rollers mounted for rotation on said stub shafts and arranged to engage the bearing sleeve and a split ring disposed between said parallel rings and adapted to frictionally engage the bearing for preventing longitudinal movement of the bearing unit.

3. The combination with a bearing sleeve, of a roller bearing unit, said unit comprising a pair of flat metal rings disposed in parallel relation about the central axis of the sleeve each of said rings having openings, a series of stub shafts projecting through certain openings in each of rings, the ends of the stub shafts entering openings in the opposite ring, rollers mounted for rotation on said stub shafts and arranged to engage said bearing sleeve, and a split spring ring disposed between said parallel rings and arranged to engage the bearing sleeve for preventing longitudinal movement of the unit with respect to the sleeve.

4. The combination with a bearing sleeve, of a roller bearing unit comprising a pair of parallel rings having a plurality of holes therein, a split ring disposed between said parallel rings and arranged to frictionally engage said bearing sleeve; a plurality of stub shafts disposed in the alined holes of said parallel rings for securing said parallel rings to each other, and rollers mounted for rotation on said stub shafts.

5. The combination with a bearing sleeve, of a roller bearing unit comprising a pair of parallel rings having a plurality of holes therein, a split ring disposed between said parallel rings and adapted to frictionally engage said bearing sleeve, a plurality of stub shafts disposed in the alined holes of said parallel rings for securing said parallel rings to each other, every other stub shaft extending from the same side of one of the rings and having a roller mounted thereon.

WILLIAM S. HALSEY.